US009682786B2

(12) United States Patent
Hailu et al.

(10) Patent No.: US 9,682,786 B2
(45) Date of Patent: Jun. 20, 2017

(54) ISOLATION SYSTEMS FOR IMAGE DATA GATHERING DEVICES

(71) Applicant: Goodrich Corporation, Charlotte, NC (US)

(72) Inventors: Haftay Hailu, Acton, MA (US); Ian P. Humphrey, Foxboro, MA (US); Michael C. Marden, Merrimac, MA (US); Mario Pieri, Chelmsford, MA (US); Joanna Langworthy, Merrimack, NH (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 14/705,191

(22) Filed: May 6, 2015

(65) Prior Publication Data
US 2016/0325848 A1 Nov. 10, 2016

(51) Int. Cl.
B64D 47/08 (2006.01)
F16F 15/00 (2006.01)
B60G 15/06 (2006.01)
F16F 15/02 (2006.01)
B60G 17/016 (2006.01)
(Continued)

(52) U.S. Cl.
CPC .......... B64D 47/08 (2013.01); B60G 15/067 (2013.01); B60G 17/016 (2013.01); F16F 9/532 (2013.01); F16F 15/00 (2013.01); F16F 15/02 (2013.01); G03B 15/006 (2013.01); B60R 11/04 (2013.01); B64C 2201/127 (2013.01);
(Continued)

(58) Field of Classification Search
CPC ...... F16F 15/02; F16F 2224/045; F16F 13/06; F16F 9/3292; F16F 9/532; F16F 15/00; B64C 2201/127; B60G 15/067; B60G 17/016; B60G 2600/184; B60G 2600/1877; B60R 11/04; B64D 47/08
See application file for complete search history.

(56) References Cited

U.S. PATENT DOCUMENTS 6,145,393 A 11/2000 Canton
6,923,298 B2* 8/2005 Tanner .................. B60G 13/14
188/136
(Continued)

FOREIGN PATENT DOCUMENTS

AU 2010201262 A1 10/2010
EP 2357098 A2 8/2011
(Continued)

OTHER PUBLICATIONS

European Search Report from the European Patent Office dated Sep. 27, 2016 for Application No. EP16168614.

Primary Examiner — Jason Holloway
(74) Attorney, Agent, or Firm — Locke Lord LLP; Scott D. Wofsy; Christopher J. Cillié

(57) ABSTRACT

An image gathering system includes an intelligence, surveillance and reconnaissance (ISR) device, an isolation system with a damper, and a controller operatively associated with the damper. The damper has a vehicle coupling and a payload coupling, and the payload coupling is connected to the ISR system. The controller is operatively associated with the damper to change the damping coefficient of the damper based on an expected vibration signature of a vehicle coupled to the isolation system through the vehicle coupling of the damper.

13 Claims, 3 Drawing Sheets

(51) Int. Cl.
*F16F 9/53* (2006.01)
*G03B 15/00* (2006.01)
*F16F 9/32* (2006.01)
*F16F 13/06* (2006.01)
*B60R 11/04* (2006.01)

(52) U.S. Cl.
CPC ............. *F16F 9/3292* (2013.01); *F16F 13/06* (2013.01); *G03B 2205/0007* (2013.01)

(56) References Cited

U.S. PATENT DOCUMENTS

| | | | |
|---|---|---|---|
| 8,424,832 B2 | 4/2013 | Robbins et al. | |
| 8,473,163 B2* | 6/2013 | Hiemenz | B60N 2/4242 |
| | | | 248/562 |
| 8,711,223 B2 | 4/2014 | Ellison | |
| 8,829,899 B2 | 9/2014 | Polzer et al. | |
| 8,972,125 B1 | 3/2015 | Elliott | |
| 9,348,197 B2* | 5/2016 | Lewis | G03B 17/561 |
| 2004/0212132 A1* | 10/2004 | Tanner | B60G 13/14 |
| | | | 267/140.11 |
| 2006/0158968 A1* | 7/2006 | Vanman | G08G 1/054 |
| | | | 369/27.01 |
| 2006/0232891 A1* | 10/2006 | Bushnik | G01D 3/08 |
| | | | 360/265.6 |
| 2012/0104169 A1* | 5/2012 | von Flotow | B64C 39/024 |
| | | | 244/131 |
| 2012/0263445 A1 | 10/2012 | Beasley | |
| 2012/0327230 A1* | 12/2012 | Ellison | F16F 15/00 |
| | | | 348/148 |
| 2013/0200248 A1* | 8/2013 | Polzer | G01R 33/022 |
| | | | 248/550 |
| 2013/0277500 A1 | 10/2013 | Miller | |
| 2014/0262645 A1* | 9/2014 | Modrzejewski | F16F 1/36 |
| | | | 188/267.1 |
| 2015/0088378 A1 | 3/2015 | Sugai et al. | |
| 2015/0267771 A1* | 9/2015 | Modrzejewski | F16F 1/36 |
| | | | 188/267.1 |

FOREIGN PATENT DOCUMENTS

| | | |
|---|---|---|
| EP | 2778056 B1 | 2/2015 |
| WO | WO-2013192370 A2 | 12/2013 |

* cited by examiner

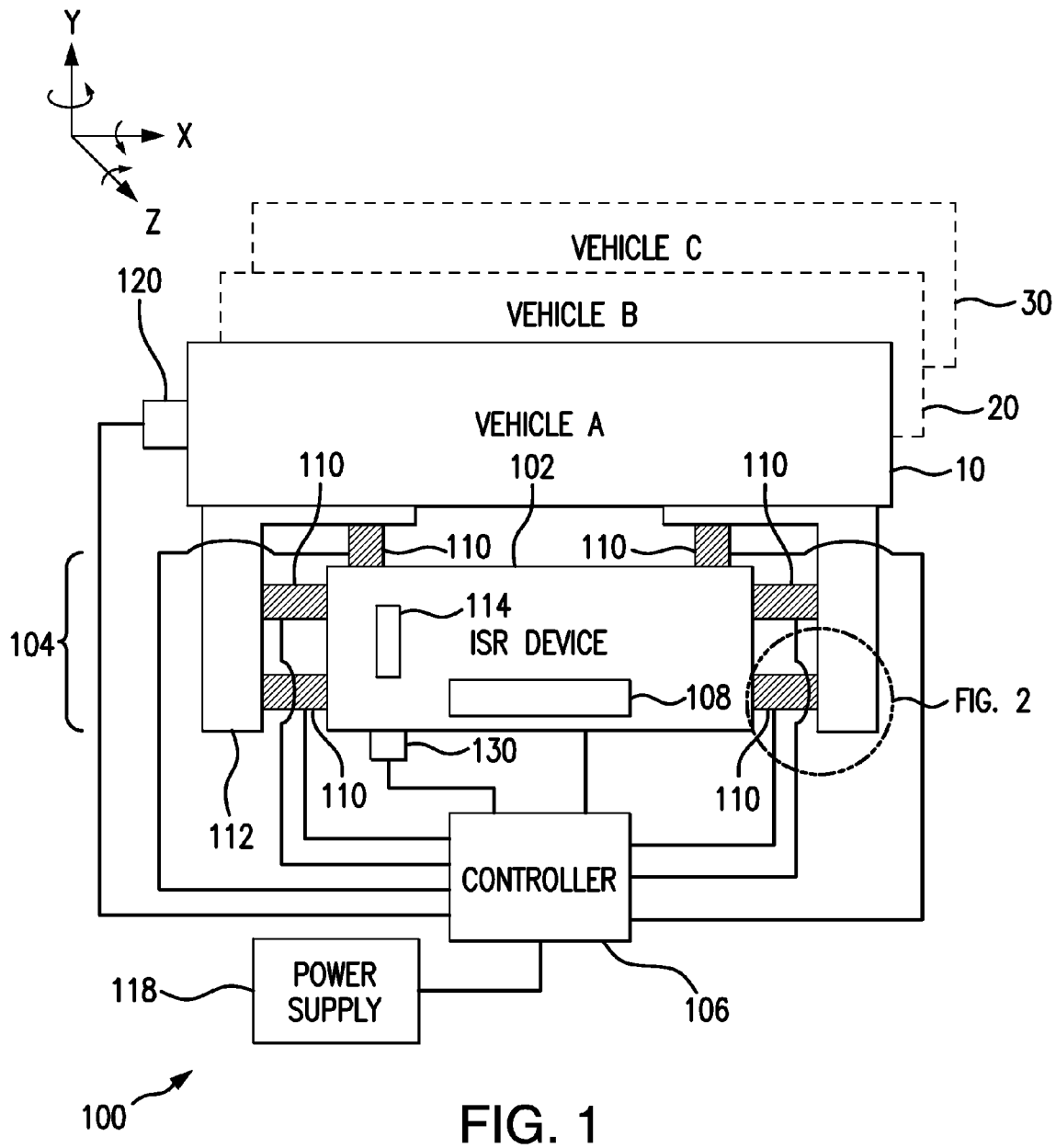
FIG. 2

ISOLATION SYSTEMS FOR IMAGE DATA GATHERING DEVICES

BACKGROUND OF THE INVENTION

1. Field of the Invention

The present disclosure relates to imaging, and more particularly to vibration isolation systems for image data gathering devices.

2. Description of Related Art

Vehicles commonly employ imaging systems in terrestrial, marine, and aerospace applications to gather information relating to the environment surrounding the vehicle. For example, some types of aircraft are configured to carry one or more intelligence, surveillance, and reconnaissance (ISR) systems that acquire image data of terrain overflown by the aircraft. The quality of the image data acquired by the aircraft is typically influenced by the effectiveness of how well the ISR system is isolated from the aircraft mounting the ISR system, both in terms of discrete shock events and repetitive impulses from vibratory forces. Since some ISR systems are more sensitive to such shocks and vibration than others, isolation devices are included either on the aircraft, on an intermediate structure connected between the aircraft and the ISR system, or as structures integrated into the ISR system to isolate the ISR system from shock and/or vibrational signatures that are characteristic of a specific type of aircraft. Such isolators may be tuned for a specific range of shock and vibration exhibited by a certain type of aircraft, such as during takeoff, cruise, and landing flight regimes.

Such conventional methods and systems have generally been considered satisfactory for their intended purpose. However, there is still a need in the art for improved isolation devices and isolation systems that provide platform flexibility. The present disclosure provides a solution for this need.

SUMMARY OF THE INVENTION

An image gathering system includes an intelligence, surveillance and reconnaissance (ISR) system, an isolation system with an adaptive damper, and a controller operatively associated with the adaptive damper. The adaptive damper has a vehicle coupling and a payload coupling, and the payload coupling is connected to the ISR system. The controller is operatively associated with the adaptive damper to change a damping characteristic of the adaptive damper based on an expected vibration signature of a vehicle coupled to the isolation system through the vehicle coupling of the adaptive damper.

In certain embodiments, the controller can include a module with machine-readable instructions recorded on the module to receive an input indicating a vehicle type, e.g. aircraft type, that the system is (or is to be) connected to and adapt the damping characteristics of the damper such that the ISR system is isolated from a vibration disturbance type that is unique to the indicated vehicle type. For example, if the input indicates that the system is to be flown on a Bell 206 helicopter, the controller can be configured to change the damping characteristics of the adaptive damper such that the ISR system is isolated from vibration disturbance characteristic of Bell 206 helicopters.

In accordance with certain embodiments, the system can also include one or more vibration sensors that are communicative with the module, and the instructions can further cause the module to receive vibration data from the sensor and change the damping characteristics using the received vibration data. It is contemplated that the vibration sensor provide vibration information relating to internal and external shocks experienced by a vehicle coupled to the system, such as shocks experienced while an aircraft is in a takeoff or landing flight regime.

It is also contemplated that, in accordance with certain embodiments, the adaptive damper can include a variable damper with first and second damping coefficients. The first damping coefficient can be associated with a first vehicle type and the second damping coefficient can be associated with a second vehicle type. The adaptive damper can include a fluid damper. The adaptive damper can include both a tunable passive damping element and an active damping element. The ISR system have six degrees of freedom relative to a vehicle mounting the ISR system, and the damper can include between six and ten dampers arranged to isolate the ISR system relative to each of the six degrees of freedom. A mount can be connected to the vehicle coupling of the damper, such as a gimbal pivotally supporting the ISR system. It is also contemplated that, in accordance with certain embodiments, the ISR system can include at least one of an optical, radar, or infrared image data collection apparatus.

In an aspect, a method of isolating an ISR system from vibration includes receiving input identifying a vehicle vibration signature from a plurality of predetermined vehicle vibration signatures, adjusting a damping response of an adaptive damper connected to the ISR system based on the identified vehicle vibration signal, and isolating the ISR system using the adaptive damper. In certain embodiments, the method can also include receiving vibration data from a vibration sensor coupled to a vehicle connected to the ISR system and/or the ISR system, and can further include actively damping the ISR system based on the received vibration data.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic view of an exemplary embodiment of an image gathering system constructed in accordance with the present disclosure, showing an intelligence, surveillance and reconnaissance (ISR) system connected to an isolation system with a controller;

FIG. 2 is a schematic view of a damper of the isolation system of FIG. 1, showing passive and adaptive damping elements of the damper;

DETAILED DESCRIPTION OF THE PREFERRED EMBODIMENTS

Figure 3:
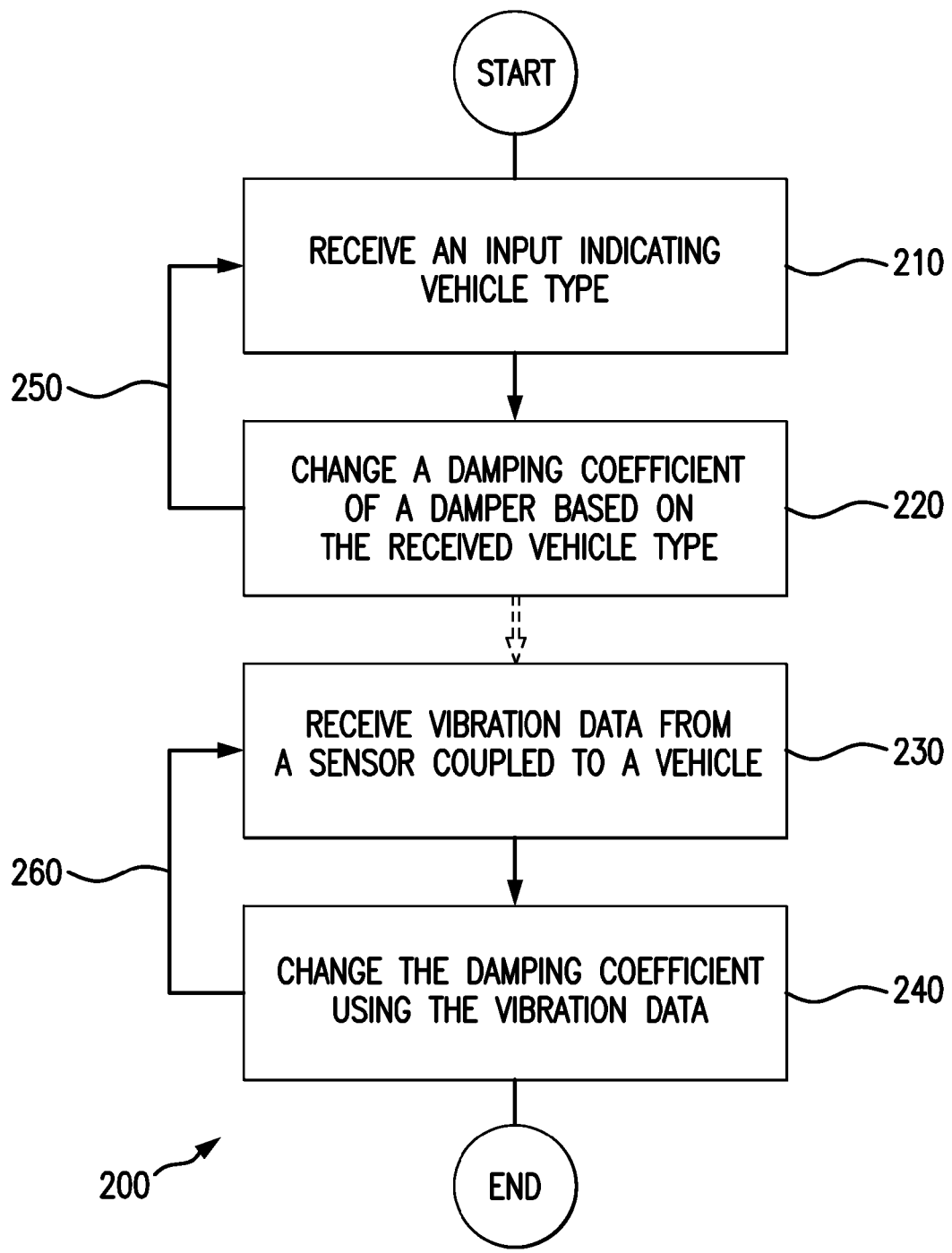
FIG. 3 is a diagram of a method of isolating an ISR system from vibration using the isolation system shown in FIG. 1.

Reference will now be made to the drawings wherein like reference numerals identify similar structural features or aspects of the subject disclosure. For purposes of explanation and illustration, and not limitation, a partial view of an exemplary embodiment of an image gathering system in accordance with the disclosure is shown in FIG. 1 and is designated generally by reference character 100. Other embodiments of image gathering systems and methods of isolating such systems from vibration in accordance with the disclosure, or aspects thereof, are provided in FIGS. 2-4, as will be described. The systems and methods described herein can be used for adapting image gathering system for use on more than one platform, such as different types of aircraft with different vibration profiles.

As shown in FIG. 1, image gathering system 100 includes an intelligence, surveillance and reconnaissance (ISR) system 102, an isolation system 104 and a controller 106. ISR system 102 includes one or more of an optical, radar or infrared image collection apparatus 108. Isolation system 104 includes at least one adaptive damper 110 that couples ISR system 102 to a vehicle 10, and in the illustrated exemplary embodiment includes six dampers. Controller 106 is operably associated with adaptive damper 110 to change a damping coefficient of adaptive damper 110 based on an expected vibration profile of a vehicle to which image gathering system 100 is connected, e.g. vehicle 10. It is to be appreciated and understood that isolation system 104 can include one, two, or more dampers, as suitable for an intended application.

It is contemplated that vehicle 10 is a first vehicle having a first vibration signature that is characteristic of a specific type of vehicle. The first vibration signature is different from a second vibration signature associated with a second vehicle 20. For example, vehicle 10 can be a rotary wing aircraft with four blades that has a repetitive vibration signature with a frequency spike equivalent to four times the rotational speed of a main rotor shaft of the aircraft. Vehicle 20 can be a rotary wing aircraft with two blades and having a repetitive vibration signature with a frequency spike at two the rotational speed of aircraft main rotor shaft. Isolation system 104 can be configured to damp vibrations associated with both vibration signatures. This enables employment of image gathering system 100 on both types of aircraft without having to dedicate the tuning setup of isolation system 104 to a specific type of aircraft, thereby providing operational flexibility to the user.

A mount 112 can be connected between adaptive damper 110 and vehicle 10. In embodiments, ISR system 102 may also include or more gimbals 114 supporting collection apparatus 108. In certain embodiments, ISR system 102 is damped within six degrees of freedom.

In embodiments, isolation system 104 includes a power supply 118 that is connected to controller 106. Power supply 118 may provide power to controller 106 and/or distribute power to one or more dampers 110 having an active damping element 116 (shown in FIG. 2).

In certain embodiments isolation system 104 includes a vibration sensor 120 such as an accelerometer. Accelerometer 120 is connected to controller 106 and configured to provide vibration data to controller 106. Controller 106 receives the data and alters the damping response to the isolation system 104 using the data. For example, controller 106 may initiate active damping of ISR system 102 in the event that data received from accelerometer 120 indicates that vehicle 10 has experienced an internal or external shock. Examples of internal shocks include transitions from one flight regime to another, e.g. from standstill to takeoff, takeoff to cruise, or cruise to landing. Controller 106 may also cause ISR system to cease imaging and/or place itself into a protected configuration in the event that the vibration data exceeds a predetermined level.

With reference to FIG. 2, adaptive damper 110 is shown. Adaptive damper 110 includes a payload coupling 122, a vehicle coupling 124, active damper 116, a passive damper 126. Payload coupling 122 connects to ISR system 102 (shown in FIG. 1). Vehicle coupling 124 connects to either mount 112 (shown in FIG. 1) or directly to vehicle 10 (shown in FIG. 1), depending on the configuration and placement of damper 110.

Adaptive damper 110 may be a variable damper, meaning that a damping coefficient of adaptive damper 110 can be adjusted based on a signal received from controller 106 (shown in FIG. 1). For example, adaptive damper 110 may include a fluid damping element where fluid flow properties within adaptive damper 110 change based on a command signal from controller 106. It is also contemplated that adaptive damper 110 may employ one or more controlled valves, magnetorheological elements, or electrorheological elements.

With reference to FIG. 3, a method 200 of isolating an ISR system, e.g. ISR system 102, from a vehicle, e.g. vehicle 10, is shown. Method 200 includes input identifying a vehicle vibration signature from a plurality of predetermined vehicle vibration signatures as shown with box 210. Method 200 also includes adjusting a damping response of a damper, e.g. adaptive damper 110, connected to the ISR system based on a vibration signal the identified vehicle, as shown with box 220, and isolating the ISR system vibrations associated with the vehicle, such as by altering the damping coefficient of an adaptive damper, e.g. adaptive damper 110. Method 200 also includes changing the damping response (damping coefficient) from that suitable for a first vehicle to a second vehicle, e.g. from first vehicle 10 to second vehicle 20, as shown with arrow 250.

Method 200 can also include receiving vibration data from a sensor, e.g. vibration sensor 120, coupled to the vehicle, as shown with box 230. Method 200 may further include changing the damping coefficient of the damper using the vibration data, such as by ceasing image data collection, placing the ISR system into a protected state, or adaptively damping a disturbance to the ISR system, as shown with box 240. Such active adaptive damping may be in response to internal or external vibration experienced by the vehicle, as shown with arrow 260.

Figure 4:
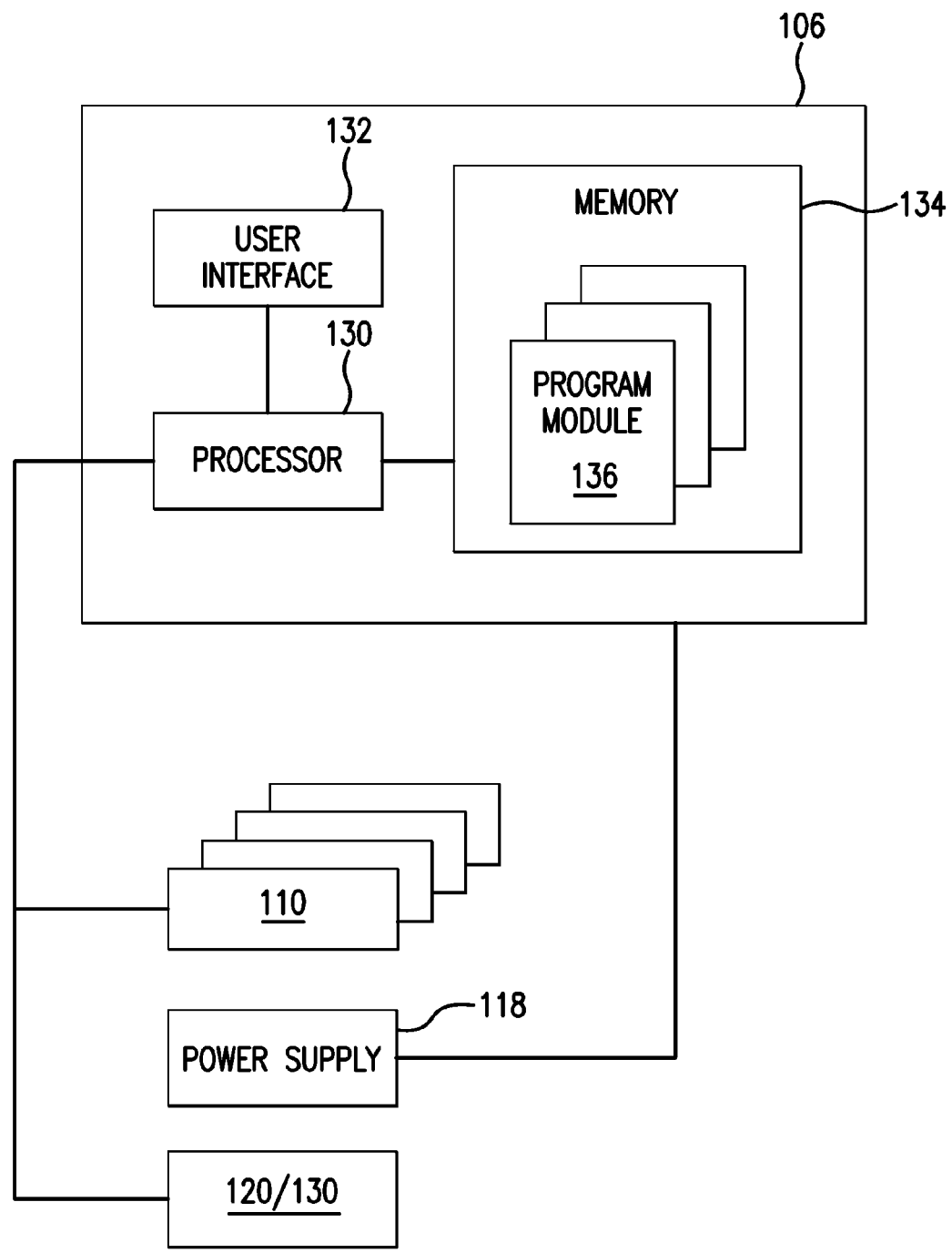
FIG. 4 is a schematic view of the controller of FIG. 1, showing a module communicative with both a memory and a vibration sensor.

With reference to FIG. 4, controller 106 is shown. Controller 106 includes a module 130 communicative with a user interface 132 and a memory 134. Memory 134 has a plurality of program modules 136 recorded thereon that contain instructions that, when read by module 106, cause module 106 to undertake the operations described above. One or more program modules 106 may include, for example, damping coefficients assignable to dampers 110 for specific types of vehicles. This enables a user (or a computer program) to identify a vehicle type to which image gathering system 100 (shown in FIG. 1) is attached using user interface 132 and have module 130 change the damping performance of any one or all of dampers 110.

The methods and systems of the present disclosure, as described above and shown in the drawings, provide adaptive image gathering systems with superior properties including the ability to be employed on different types of vehicles (platforms) without hardware or software changes. This enables the user to employ the system on multiple platforms without the need for specialized technical assistance to change the configuration of the image gathering system or maintain a suite of image gathering systems for use on different platforms within a fleet. In embodiments, the user may change the payload (i.e. ISR system 102) for different missions in the field by updating or selecting different sets of adaption parameters. In certain embodiments, the image gathering system allows for slowly adjusting the jitter or smear in imaging data acquired with the ISR system depending on the flight regime and sensor modality. For example, the adaptive damping system may be commanded perform at its softest state to provide the lowest amount of jitter or smear, thereby providing relatively high image quality. It is contemplated that controller 106 (shown in FIG. 1) may determine the optimum damping characteristic during image data collection and cause the adaptive isolation system to damp the ISR system using the adaptive dampers during image data collection.

While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An image gathering system, comprising:
   an intelligence, surveillance and reconnaissance (ISR) system;
   an isolation system having at least one adaptive damper, wherein the adaptive damper has vehicle and payload couplings, the payload coupling being connected to the ISR system,
   wherein the adaptive damper comprises a variable damper with a first and second damping characteristics, the first damping coefficient being associated with a first vehicle type, and the second damping coefficient being associated with a second vehicle type; and
   a controller operatively associated with the adaptive damper and configured to change a damping characteristic of the variable damper from the first damping coefficient to the second damping coefficient based on an expected vibration signature of a vehicle carrying the image gathering system for isolating the image gathering system from the vehicle carrying the image gathering system.

2. The image gathering system as recited in claim 1, wherein the adaptive damper comprises a variable fluid damper.

3. The image gathering system as recited in claim 1, wherein the ISR system has six degrees of freedom relative to a vehicle mounting the ISR system, and the isolation system comprises between six and ten adaptive dampers arranged to isolate the ISR system relative to each of the six degrees of freedom.

4. The image gathering system as recited in claim 1, further including a vibration sensor communicative with the controller to receive information relating to vehicle vibration and external shocks.

5. The image gathering system as recited in claim 1, further including a mount connected to the vehicle coupling of the adaptive damper.

6. The image gathering system as recited in claim 1, wherein the isolation system includes four adaptive dampers.

7. The image gathering system as recited in claim 1, further including a power supply connected to the controller.

8. The image gathering system as recited in claim 1, wherein the ISR system comprises an optical, radar, or infrared image collection apparatus.

9. An image gathering system, comprising:
   an intelligence, surveillance and reconnaissance (ISR) system;
   an isolation system having at least one adaptive damper, wherein the adaptive damper has vehicle and payload couplings, the payload coupling being connected to the ISR system,
   a controller operatively associated with the adaptive damper to change a damping characteristic of the adaptive damper based on an expected vibration signature of a vehicle coupled to the isolation system through the adaptive damper vehicle coupling,
   wherein the controller further comprises a processor communicative with a memory, the memory having instructions recorded thereon that, when read by the processor, cause the processor to:
   receive an input indicating a vehicle type;
   change the damping coefficient of the adaptive damper such that the ISR system is isolated from a vibration signature associated with the vehicle type for isolating the image gathering system from a vehicle carrying the image gathering system.

10. The image gathering system as recited in claim 9, wherein the instructions further cause the processor to receive vibration data from a vibration sensor communicative with the processor and change a damping characteristic of the adaptive damper using the received vibration data.

11. An image gathering system, comprising:
    an intelligence, surveillance and reconnaissance (ISR) system;
    an isolation system having at least one adaptive damper and a vibration sensor,
    wherein the adaptive damper has vehicle and payload couplings, the payload coupling being connected to the ISR system,
    wherein the vibration sensor is configured mechanically couple to a vehicle; and
    a controller communicative with the vibration sensor and operatively associated with the adaptive damper to change a damping coefficient of the adaptive damper based on an expected vibration signature of a vehicle coupled to the isolation system through the damper vehicle coupling and vibration data received from the vibration sensor,
    wherein the adaptive damper comprises a variable damper with a first and second damping coefficients, the first damping coefficient being associated with a first vehicle type, the second damping coefficient being associated with a second vehicle type.

12. The image gathering system as recited in claim 11, wherein the adaptive damper comprises an adaptive damping element and an active damping element.

13. The image gathering system as recited in claim 11, wherein the adaptive damper comprises a variable fluid damper.

* * * * *